United States Patent Office 3,428,731
Patented Feb. 18, 1969

3,428,731
STABLE DISPERSIONS OF FINELY DIVIDED
PHOSPHATE-PROCESS CUPRIC HYDROXIDE
William H. Furness, deceased, late of Haddonfield, N.J.,
by Mary A. Furness, Executrix, Haddonfield, N.J., assignor to Kennecott Copper Corporation, New York,
N.Y., a corporation of New York
No Drawing. Filed Oct. 19, 1965, Ser. No. 498,153
U.S. Cl. 424—140                                     20 Claims
Int. Cl. A01n 11/04, 13/00

ABSTRACT OF THE DISCLOSURE

This invention relates to stable aqueous dispersions of finely divided phosphate process cupric hydroxide having a pH from about 7 to 9.5.

---

This invention relates to dispersions of phosphate-process cupric hydroxide. More particularly, the invention relates to aqueous dispersions of finely divided, phosphate-process cupric hydroxide. Such dispersions are useful for biocidal purposes, particularly for fungicidal applications.

Although cupric hydroxide has been referred to frequently in the literature, it is not a simple, well-defined chemical. When a base, such as sodium hydroxide, is added to a solution of one of common, water-soluble copper salts, such as, for example, copper sulfate, a blue, gelatinous precipitate is formed that gradually turns black in color. This precipitate is not a stable or simple material, and apparently consists of a mixture of the hydroxide, cupric oxide hydrate, and cupric oxide.

The nature of such a precipitate changes with time, temperature, drying, and the like. Such changes proceed, for example, in the fungicidal mixture known as Bordeaux mixture, that is prepared by mixing together copper sulfate and lime. This mixture is freshly made before application, in order to be effective, because of the chemical changes that occur in it over a period of time.

Attempts to avoid such undesirable changes in composition, as occur in Bordeaux mixture, led to the development of the so-called fixed coppers, such as, for example, tribasic copper sulfate, copper oxychloride, copper-zinc chromate, and the like, that can be stored, mixed with water or dusted when needed for use.

United States Reissue Patent 24,324, granted May 28, 1957, discloses a process for making a stable cupric hydroxide. This process comprises reacting substantially equal molar amounts of copper sulfate and trisodium phosphate, to obtain a copper-containing precipitate. Sodium hydroxide is then added in an amount sufficient to convert a major portion of the precipitate to cupric hydroxide. The addition of sodium hydroxide regenerates trisodium phosphate. The reactions may be characterized as follows:

Eq. 1.  $CuSO_4 + NA_3PO_4 \rightarrow CuNaPO_4 + Na_2SO_4$

Eq. 2.  $2NaOH + CuNaPO_4 \rightarrow Na_3PO_4 + (OH)_2$

The process is continued by alternately adding copper sulfate and sodium hydroxide. As many as 15 or 20 of these additions may be made in producing a batch of cupric hydroxide by this process. A dry, solid product is obtained by separating the solids from the mother liquor, washing, drying, and grinding.

It has now been found that the many variables in this multistep process may be adjusted over wide ranges to produce phosphate-process cupric hydroxide products of differing characteristics. These variables includes not only the usual factors such as temperature, concentrations, ratios, pH and the like, but also other factors such as the use of other reactants. For example, in some cases, it may be desirable to produce a cupric hydroxide product that contains a minor but appreciable amount of phosphate. In such a case, calcium hydroxide may be substituted for at least a part of the sodium hydroxide, in the production process, so that the final product includes calcium phosphate as an inert diluent.

The products of this process may therefore differ in composition and characteristics, but are identified collectively hereinafter by the general term, "phosphate-process cupric hydroxide." It will be understood that this term refers to a product produced in the manner described, and containing a substantial amount of cupric hydroxide, together with detectable phosphate, and, usually, detectable sulfate.

A typical phosphate-process cupric hydroxide product, produced in accordance with the method of Re. 24,324, as described generally above, is characterized by being a water-insoluble material, having a very fine particle size. In contrast with previously available copper hydrate products, it is stable in dry, powdered form, and can be stored over extended periods of time without change in color or loss in its useful properties.

Prior art copper hydrate products have not only tended to be unstable in chemical characteristics, chemical composition and color, but they also have typically been incapable of forming practically useful, stable aqueous suspensions for a variety of reasons. For example, dispersions and mixtures of copper hydrate products in water are often not flowable at solids concentrations in excess of about 25% by weight of the mixture. This has limited the use of such products in biocidal and other applications.

One object of the present invention is to provide aqueous dispersions of finely divided, phosphate-process cupric hydroxide, useful for a variety of practical applications, and having commercially acceptable stability as to both chemical and physical properties.

A further object of the invention is to provide new, effective, practical fungicidal compositions.

Another object of the invention is to provide stable aqueous dispersions of finely divided, phosphate-process cupric hydroxide, that are suitable for use for a number of practical applications, particularly in the fungicidal field.

A related object of the invention is to provide such dispersions that contain fungicidally-effective amounts of the phosphate-process cupric hydroxide, and that are sufficiently stable that the cupric hydroxide will not settle out to form hard conglomerates, even after storage over prolonged periods of time or under adverse conditions, and that are flowable, even at extremely high solids contents, to facilitate handling.

Other objects of the invention will be apparent hereinafter from the specification and from the recital of the appended claims.

Following the procedure that is described in Reissue 24,324, a phosphate-process cupric hydroxide product was prepared and dried to a powder. The approximate chemical analysis specifications of this product can be stated as follows:

| Chemical specifications: | Percent by weight |
|---|---|
| Copper content (expressed as metallic copper) | 53.0–64.00. 2.0–7.0 or higher; |
| Phosphorous content (as $P_2O_5$) | preferably 3–4. |
| Sulfate content (as $SO_4$) | 0.5–3.0. |
| Free water content | 1–5. |

Products made in accordance with these specifications are stable for indefinite periods of time when stored at temperatures that do not exceed 120° F. The powder is light blue in color, and has an acicular alternate crystal form. The dry powder has a true specific gravity of approximately 4.0, and a bulk density of from about 5 to 15 lbs. per cubic foot. The individual particles are in colloidal size range, that is, within the size range from about 0.001 micron up to 1 micron. If permitted to stand in saturated air at 15° C., the moisture content of the dried powder will rise gradually until an equilibruim is attained at about 8.9% or higher.

Considerable practical difficulties have been encountered in the past in preparing and in utilizing aqueous suspensions of copper hydrate products in general and of cupric hydroxide products in particular. Depending upon the material being used, and upon other pertinent factors including the hardness of the water, the pH of the water, the presence or absence of a protective material such as soap or starch, the amount of solid material attempted to be kept in suspension, and the like, there often occurred unpredictable, uncontrollable, and undesirable demonstrations of instability, such as, for example, settling out of the solid particles, formation of a hard gel, formation of agglomerates, or, in some instances, the formation of hard cakes. Such demonstrations of instability have hampered commercial exploitation of products of these kinds.

It has now been found that substantially uniform aqueous dispersions of finely divided, phosphate-process cupric hydroxide, of commercially acceptable stability, can be made by dispersing the phosphate-process cupric hydroxide in an aqueous vehicle under carefully regulated pH conditions, where the pH of the dispersion is in the range of from about 7.0 to about 9.5 and preferably where the hardness of the aqueous vehicle is equivalent to not greater than about 180 p.p.m. $CaCO_3$. Such dispersions are attractive for a variety of applications when the content of the phosphate-process cupric hydroxide, by weight, is in the range from about 0.1% to about 40%; and are fungicidally effective and economically attractive when the content of phosphate-process cupric hydroxide is in the range from about 0.5% to about 40%. For shipment in concentrated form to a point of local use, stable dispersions containing at least about 10% to 20%, and preferably at least 33% by weight of the phosphate-process cupric hydroxide are desirable and can be made in accordance with the present invention.

The phosphate-process cupric hydroxide, in accordance with the specifications set forth above, ordinarily will contain phosphate and sulfate ions, in amounts that can be regulated by careful control of the proportions of the respective reactants, that are used in the manufacturing process. For fungicidal applications, a phosphate content of about 5% by weight of solids, dry basis, is advantageous and desirable in many cases.

Beyond the limits of the preferred pH range of 7.0 to 9.5, conditions are unfavorable for stability. At low pH values, chemical changes occur and the copper goes into solution. At high pH values, chemical changes also occur and the cupric hydroxide loses its distinctive characteristics as it converts to copper oxide.

The following specific examples will illustrate several preferred embodiments of the invention.

EXAMPLE I

Stable dispersions were prepared, in this example, utilizing as a dispersing agent a highly purified sodium lignosulfonate, anionic in aqueous solution.

In this and the following examples, the dispersions were prepared by adding all of the ingredients successively to a predetermined quantity of the aqueous vehicle, and agitating. The dispersant was, and always should be, added to and mixed with the aqueous vehicle before the phosphate-process cupric hydroxide. The aqueous vehicle was selected to have an initial hardness not in excess of equivalent to about 180 p.p.m. of $CaCO_3$. The pH of the dispersion was adjusted, as necessary, to be in the range from about 7.5 to about 9.5.

The following dispersions were prepared:

TABLE I

| Dispersion No. | Percent Phosphate-Process Cupric Hydroxide, based on the entire mixture | Percent Dispersing Agent [1] | Viscosity of Dispersion [2] | Percent Protective Colloid (Water-soluble Lecithin) |
|---|---|---|---|---|
| 1 | 10 | 1 | | |
| 2 | 33.3 | 1 | 10,000 | |
| 3 | 33.3 | 1 | 33,000 | 1 |
| 4 | 33.3 | 2 | 26,000 | 1 |

[1] By weight, based on total inorganic solids, dry basis; used in all subsequent examples also, as to the dispersant.
[2] Units, centipoises, as measured on a Brookfield viscometer using a T-type spindle at 2.5 r.p.m.; used throughout except where otherwise specified.

In this and all subsequent examples, all percentages are by weight.

Lecithin was added in this and some subsequent examples, for dispersions having high solids contents. It serves as a protective colloid, and inhibits agglomeration.

All of the dispersions described in Table I exhibited excellent stability.

EXAMPLE II

Excellent dispersions were also made, using as a dispersing agent the sodium salt of a polymeric carboxylic acid, which is an anionic liquid in its commercial form.

TABLE II

| Dispersion No. | Percent Phosphate-Process Cupric Hydroxide | Dispersing agent, based on dry inorganic solids | Viscosity of Dispersion | Percent Protective Colloid (Water-soluble Lecithin) |
|---|---|---|---|---|
| 5 | 10.0 | 1 | | |
| 6 | 33.3 | 1.5 | 5,400 | |
| 7 | 33.3 | 1.5 | 3,300 | 1 |
| 8 | 33.3 | 2.0 | [1] 8.4 | |
| 9 | 33.3 | 2.0 | [1] 179 | 1 |
| 10 | 37.3 | 1.6 | | |
| 11 | 45.1 | 1.5 | | |
| 12 | 58.0 | 6.0 | ([2]) | |

[1] As measured on the Brookfield viscometer using an RV type spindle at 50 r.p.m.
[2] Above 10,000.

Density measurements were made on dispersions No. 11 and 12, respectively, and were: 1.34 grams per milliliter; and 1.45 grams per milliliter.

All of the dispersions were stable over prolonged periods of time. The dispersions containing lecithin exhibited good resistance to the formation of agglomerates under unfavorable storage conditions.

EXAMPLE III

Additional dispersions were made up, using as the dispersing agent a commercially available sulfonated naphthalene:

TABLE III

| Dispersion No. | Percent Phosphate-Process Cupric Hydroxide | Percent Dispersing Agent, based on dry inorganic solids | Viscosity of Dispersion |
|---|---|---|---|
| 13 | 10 | 1 | |
| 14 | 33.3 | 1 | 45,000 |
| 15 | 33.3 | 1.5 | 27,000 |
| 16 | 33.3 | 2.0 | 7,600 |

The above dispersions were acceptably stable when stored at ordinary room temperatures over long periods of time. These dispersions demonstrate the effect of the dispersing agent in reducing viscosity.

EXAMPLE IV

Additional formulations of aqueous dispersions, that demonstrate the use of a variety of dispersants, are as follows.

TABLE IV

| Dispersion No.: | Percent Phosphate-Process Cupric Hydroxide | Identity of Dispersing Agent | Percent of Dispersing Agent, based on dry inorganic solids | Viscosity [1] |
|---|---|---|---|---|
| 17 | 33.3 | Technical protein colloid—sold by Swift and Company under the trade identification of Swift 2185. | 3 | 380,000 |
| 18 | 33.3 | ....do.... | 5 | 400,000 |
| 19 | 33.3 | Tallow dimethyl benzyl ammonium chloride, sold by Onyx chemical under the trademark Ammonyx 856. | 1 | 510,000 |
| 20 | 33.3 | ....do.... | 2 | 520,000 |
| 21 | 33.3 | Sodium salt of polymerized alkyl aryl sulfonic acid, sold by R. T. Vanderbilt under the trademark Darvan 1. | 1 | 28,000 |
| 22 | 33.3 | ....do.... | 2 | 26,000 |
| 23 | 33.5 | Diethanolamide of special fraction of coconut fatty acids, sold by Scher Brothers under the trademark Schercomide SPO. | 1 | 33,000 |
| 24 | 33.3 | ....do.... | 2 | 37,000 |
| 25 | 33.3 | Sodium salt of condensed mono-napthalene sulfonic acid. | 1 | 30,000 |
| 26 | 33.3 | ....do.... | 2 | 32,000 |

[1] T-type spindle on a Brookfield viscometer at 2.5 r.p.m.

All of the above dispersions were characterized by satisfactory stability.

Wetting agents are useful additives for the dispersions, to facilitate spraying. Care must be exercised, however, in the selection of the wetting agent and in the amount used, to avoid foaming and increased viscosity.

Fungicidal applications

Comparative growth studies have shown that dispersions made in accordance with the present invention are effective mycotic agents against organisms that are of economic importance in agriculture, as follows:

| Organism | Significance |
|---|---|
| Cercospora Musae | Organism causing leaf spot on bananas (Sigatoka). |
| Monilia roeri | Organism causing pod rot of cocoa. |
| Alternari solani | Organism causing early blight on tomatoes. |
| Chaetomium blobosum | Standard F.F.H.A. mildew resistance. |
| Corynebact. insidiosum | Causative agent of alfalfa wilt. |
| Helminthospor. turcium pass | Causative agent of corn leaf blight. |
| Phytophthora citrophthora | Causative agent of citrus brown rot. |
| Phytophthora infestans | Causative agent of potato late blight. |
| Streptomyces scabies | Causative agent of potato scab. |
| Diplodia zeae | Corn ear and stalk rot. |
| Collectrotrichum lindemuthianum | Cause of anthracnose in beans. |
| Verticillium albo-atrum | Causative agent of cotton wilt. |
| Fusarium oxysporum | Cause of wilts in potato, muskmelon, etc. |

Dispersions made in accordance with the present invention have been demonstrated to be effective in the control of many other troublesome agricultural conditions, in addition to those identified above, such as, for example, crown rot of the banana, cercospora leaf spot of celery and sugar beets, and pear fire blight.

In wet climates, one or more materials can be added to the aqueous fungicidal dispersions that are made in accordance with this invention, to promote retention of the cupric hydroxide particles on the plant sites where applied. The following example is illustrative.

EXAMPLE V

Stable aqueous dispersions were madeup with phosphate-process cupric hydroxide, for evaluation for fungicidal activity, as follows:

TABLE V

| Dispersion No.: | Percent Phosphate-Process Cupric Hydroxide | Percent Dispersing Agent | Percent Emulsified Petroleum Wax |
|---|---|---|---|
| 27 | 1.4 | 1 | 10 |
| 28 | 2.9 | 1 | 10 |
| 29 | 5.7 | 1 | 10 |
| 30 | 5.7 | 1 | |

The dispersing agent used was isooctyl phenyl polyethoxy ethanol, a nonionic material.

The emulsified wax was prepared as an emulsion before addition to the dispersion. It was prepared to contain approximately 51% by weight of solids, comprising a mixture of paraffin wax, microcrystalline wax, and petrolatum. The emulsion was milky in appearance and had a weight of about 8 lbs. per gallon. It was stable in the presence of acids and electrolytes. The percentage of emulsified wax that was added to each of the above dispersions, represents the wax emulsion, at 51% solids, rather than the amount of wax alone.

Each of the dispersions identified above was evaluated for effectiveness as a fungicide for the control of Monilia on Cacao, in a controlled experiment providing comparative data relative to other effective, commony used fungicides, as well as against the customary check plot in which no fungicide was employed. A significant reduction in the incidence of diseased pods was observed in those cases where each of the dispersions in this example were employed. Those dispersions that included the wax exhibited a greater sticking power or residuary action than the dispersion that did not contain wax.

By way of further example, residual, phosphate-process cupric hydroxide, after application as a spray of one of the dispersions mentioned above in this example, or other, more concentrated dispersions, at a concentration in the range from about 1.6 to about 3.3 micrograms (dry basis) per square centimeter of leaf surface, effectively inhibits the germination of *Cercospora Musae,* the cause of Sigatoka disease of bananas. This is a significantly higher inhibitory effect than is obtained with Bordeaux mixture.

An unexpected advantage of fungicidal compositions, that are made in accordance with the present invention, is that they exhibit the characteristic of high retention on plants under rainy conditions, even when the dispersion, does not include wax or other "sticking" agent. This may be attributable to the extremely small particle size of the copper hydroxide particles. It is also affected by the use of wetting agents. By observing plants after application of the dispersion, it has been found that an aqueous vehicle may, upon drying, contract and tend to clump the particles of solids into concentrated sites. The addition of a wetting agent helps to overcome this tendency.

Although erosion of the cupric hydroxide spray deposit does occur during rainfall, reduction in disease control does not deteriorate at the same rate as might be indicated by the reduction in the presence of copper. This is a completely unexpected advantage of preparations made in accordance with the present invention, and has been observed in many applications. This phenomenon is believed to be attributable to the fact that the residual particles of the phosphate-process cupric hydroxide are so finely divided that they are extremely difficult to remove, and are also highly effective in destroying fungus spores before they can induce infection.

EXAMPLE VI

The following procedure was employed in evaluating dispersions of phosphate-process cupric hydroxide, in the control of early blight on tomatoes.

Phosphate-process cupric hydroxide powder was blended with a 0.5% aqueous solution of a nonionic detergent. This blend was then diluted with water to form three different solutions containing the phosphate-process cupric hydroxide equivalent to 0.7, 2.1, and 6.3 lbs. of the cupric hydroxide per hundred gallons of dispersion, respectively. Dispersions of tribasic copper sulfate were made up at the same time, in substantially the same way, and at the same concentrations, for comparative purposes.

These dispersions were applied to test plantings of Bonny Best tomato plants by spraying. The spray was allowed to dry on the leaves for about one hour after application. Evaluations were then made of retention of the active ingredient during rainy conditions, and of fungicidal effectiveness.

The phosphate-process cupric hydroxide fungicides were considerably more effective in controlling early blight than the tribasic copper sulfate fungicides, as shown by the data that is summarized in the following table.

hydroxide particles on the plant surfaces to which they are applied, that is, to promote desirable deposition and adhesion.

General

In preparing suspensions, such as, for example, fungicidal concentrates or formulations, in accordance with the present invention, although the pH of the suspension may be kept within the range from about 7.0 to about 9.5 for acceptable stability, it is preferred that they be in the range from about 8 to about 9. The hardness of the aqueous vehicle should be equivalent to not greater than about 180 p.p.m. $CaCO_3$ for best results.

To improve the stability of a suspension, a dispersant should be employed. Preferably, an anionic dispersant with low foaming tendencies should be used. The primary purpose of a dispersant is to reduce or to eliminate agglomeration of the particles. A secondary and very valuable purpose of the dispersant is to reduce the viscosity of the suspension. This is particularly important with respect to concentrated suspensions, containing up to 60% or 70% by weight of phosphate-process cupric hydroxide, prepared for shipment to a point of use, for dilution there to use strength.

A wetting agent is a valuable addition to a suspension, for lowering surface tension, and for obtaining a uniform distribution of particles on a surface to which the suspension is applied. Frequently, a single material may serve as both a dispersing agent and a wetting agent.

Wax or wax-like additives are used to promote good adhesion of the solid particles to the surface to which the suspension is applied. Such additives preferably are used in the form of emulsions. The wax material may be an animal, vegetable or mineral wax, or a synthetic wax, such as, for example, a polyethylene wax. When a wax additive is employed, the use of a protective colloid usually produces no additional advantage. Acrylic emulsion additives are also useful and for present purposes can be considered to be wax-like additives. Other materials, such as, for example, synthetic latices, caseins, natural latices, and more complex polymeric materials, such as for exemple, modified alkyd resins, can also be employed for the same purpose as was emulsions.

The amount of wax employed may be very small. Amounts in the range from about 10% to about 50% of wax, based upon the weight of phosphate-process cupric hydroxide in the suspension, are satisfactory, although larger amounts may be used, as shown in Example IV.

While the invention has been disclosed herein by reference to the details of preferred embodiments thereof, it is to be understood that such disclosure is intended in an illustrative, rather than in a limiting sense, and it is

| Treatment Applied | Dose, lbs. 100 Gal. | Control After Rainfall (Inches) | | | | |
|---|---|---|---|---|---|---|
| | | 0" | ½" | 1" | 2" | 4" |
| | | Percent | Percent | Percent | Percent | Percent |
| Phosphate-process Cu(OH)₂ dispersion | 0.7 | 75 | 77 | 74 | 75 | 59 |
| | 2.1 | 86 | 85 | 85 | 79 | 59 |
| | 6.3 | 91 | 86 | 87 | 86 | 88 |
| Tribasic CuSO₄ dispersion | 0.7 | 43 | 50 | 20 | 28 | 44 |
| | 2.1 | 52 | 41 | 39 | 69 | 22 |
| | 6.3 | 45 | 60 | 57 | 45 | 45 |

Other stable suspensions of phosphate-process cupric hydroxide have been prepared by grinding together, in the dry state, the phosphate-process cupric hydroxide and a material such as carboxymethylcellulose or hydroxyethylcellulose. These form excellent suspensions when the dispersing agent is at a concentration of about 1% to about 2% by weight. However, these dispersions are not quite as satisfactory for application through fine spray nozzles as some of the other suspensions that have previously been described.

Wetting agents are often included in fungicidal dispersions to obtain an initial good distribution of the cupric contemplated that various modifications in the composition of the dispersions will readily occur to those skilled in the art, within the spirit of the invention and the scope of the appended claims.

We claim:
1. A stable dispersion of at least 0.1% or more by weight of finely divided, phosphate-process cupric hydroxide in an aqueous vehicle, said mixture having a pH of from about 7 to about 9.5.
2. A stable dispersion in accordance with claim 1, wherein the pH of the mixture is in the range from 8 to 9.

3. A stable dispersion in accordance with claim 1 that includes a small but effective amount of a dispersing agent.

4. A stable dispersion of at least 0.1% or more by weight of a finely divided, phosphate-process cupric hydroxide, in an aqueous vehicle, said mixture having a pH of from about 7.0 to about 9.5, and where the hardness of the aqueous vehicle is equivalent to not greater than about 180 p.p.m. $CaCO_3$.

5. A stable, substantially uniform dispersion having a pH in the range from about 7.0 to about 9.5, of at least about 0.1% or more by weight of a phosphate-process cupric hydroxide, the particles of the cupric hydroxide being in a colloidal size range in an aqueous vehicle, and a small but effective amount of a dispersing agent.

6. A stable dispersion in accordance with claim 5, wherein the pH is in the range from 8 to 9.

7. A stable dispersion in accordance with claim 5, wherein the aqueous vehicle has a hardness equivalent to not greater than about 180 p.p.m. $CaCO_3$.

8. A dispersion in accordance with claim 5, wherein the dispersing agent is an alkali metal salt of a polymeric carboxylic acid.

9. A dispersion in accordance with claim 5, wherein the dispersing agent is an alkali metal salt of a lignosulfonic acid.

10. A dispersion in accordance with claim 5, wherein the dispersing agent is an alkyl sulfate.

11. A dispersion in accordance with claim 5, wherein the dispersing agent is a sulfated fatty alcohol.

12. A dispersion in accordance with claim 5, wherein the dispersing agent is a sulfonated naphthalene.

13. A stable, substantially uniform dispersion having a pH in the range from about 7.0 to about 9.5, comprising an aqueous vehicle, a small but effective amount of a dispersing agent, at least 0.1% or more by weight of a finely divided phosphate-process cupric hydroxide, the particles of which are in the colloidal size range, and a small amount of a protective colloid effective to inhibit agglomeration.

14. A dispersion in accordance with claim 13, wherein the protective colloid is a water-soluble lecithin.

15. A dispersion in accordance with claim 13, wherein the amount of the cupric hydroxide present is from about 0.1% to about 60% by weight of the dispersion.

16. A dispersion in accordance with claim 13, wherein the dispersing agent is an anionic dispersing agent.

17. A substantially uniform dispersion having a pH in the range from about 7.0 to about 9.5, comprising an aqueous vehicle, a small but effective amount of a dispersing agent, a quantity of a finely divided phosphate-process cupric hydroxide, the particles of which are in the colloidal size range, and at least about 10% by weight of the cupric hydroxide, dry basis, of an emulsified wax.

18. A fungicidal composition comprising a stable dispersion of at least 0.1% by weight of colloidal size particles of a phosphate-process cupric hydroxide, in a fluid vehicle said dispersion having a pH in the range from about 7.0 to 9.5.

19. A fungicidal composition comprising a stable, substantially uniform dispersion having a pH in the range from 7.0 to 9.5 of: at least 0.1% by weight of a phosphate-process cupric hydroxide product, the particles of which are in a colloidal size range; an aqueous vehicle having a hardness equivalent to not greater than about 180 p.p.m. $CaCO_3$; a small but effective amount of a dispersing agent, and a small amount of a protective colloid effective to inhibit agglomeration.

20. A composition in accordance with claim 19, wherein the dispersing agent is an anionic dispersing agent that is characterized by a low tendency to foam.

References Cited

UNITED STATES PATENTS

| | | | |
|---|---|---|---|
| Re. 24,324 | 5/1957 | Furness | 23—105 |
| 2,111,050 | 3/1938 | Magill | 167—16 |
| 2,184,617 | 12/1939 | Hurd | 167—16 |
| 2,551,446 | 5/1951 | Marks | 167—16 |
| 2,962,416 | 11/1960 | Taylor | 167—16 |

ALBERT T. MEYERS, *Primary Examiner.*

S. J. FRIEDMAN, *Assistant Examiner.*

U.S. Cl. X.R.

424—141, 81, 358, 142

UNITED STATES PATENT OFFICE
CERTIFICATE OF CORRECTION

Patent No. 3,428,731            February 18, 1969

William H. Furness, deceased, by
Mary A. Furness, Executrix

It is certified that error appears in the above identified patent and that said Letters Patent are hereby corrected as shown below:

Column 1, line 58, "$(OH)_2$" should read -- $Cu(OH)_2$ --. Column 2, lines 62 and 63, "2.0-7.0 or higher; preferably 3-4." should be realigned to be opposite "Phosphorous content (as $P_2O_5$)". Columns 5 and 6, TABLE IV, second column, line 7 thereof, "33.5" should read -- 33.3 --. Column 5, line 52, "blobosum" should read -- globosum --.

Signed and sealed this 28th day of April 1970.

(SEAL)

Attest:

Edward M. Fletcher, Jr.

Attesting Officer

WILLIAM E. SCHUYLER, JR.

Commissioner of Patents